(12) United States Patent
Reifer

(10) Patent No.: US 7,031,224 B2
(45) Date of Patent: Apr. 18, 2006

(54) BUOY-TO-SAILBOAT DISTANCE INDICATOR SYSTEM

(75) Inventor: Michael Henry Reifer, Columbia, MD (US)

(73) Assignee: Michael H. Reifer, Annapolis Junction, MD (US)

( * ) Notice: Subject to any disclaimer, the term of this patent is extended or adjusted under 35 U.S.C. 154(b) by 256 days.

(21) Appl. No.: 10/763,233

(22) Filed: Jan. 26, 2004

(65) Prior Publication Data

US 2005/0162977 A1 Jul. 28, 2005

(51) Int. Cl.
*G01S 3/80* (2006.01)
(52) U.S. Cl. .......................... 367/128; 367/2; 367/118
(58) Field of Classification Search ............... 367/2, 367/3, 118, 124, 128
See application file for complete search history.

(56) References Cited

U.S. PATENT DOCUMENTS

| | | | | | |
|---|---|---|---|---|---|
| 2,326,880 | A | * | 8/1943 | Norrman | 367/128 |
| 4,207,571 | A | * | 6/1980 | Passey | 367/128 |
| 4,234,942 | A | * | 11/1980 | Prause et al. | 367/128 |
| 4,751,689 | A | * | 6/1988 | Kobayashi | 367/2 |

* cited by examiner

*Primary Examiner*—Ian J. Lobo

(57) ABSTRACT

This system is intended for use during a regatta to indicate the distance between a sailboat and a race course marker buoy being rounded as part of the race. The system involves a transmitter on the buoy and a receiver on the boat. The buoy transmitter sends both a radio signal and an acoustic signal. The boat receiver detects both the radio signal and acoustic signal. The boat receiver measures the time delay between the radio and acoustic signals. This time duration is converted to a distance and the boat receiver displays the distance information.

19 Claims, 1 Drawing Sheet

BUOY-TO-SAILBOAT DISTANCE INDICATOR SYSTEM

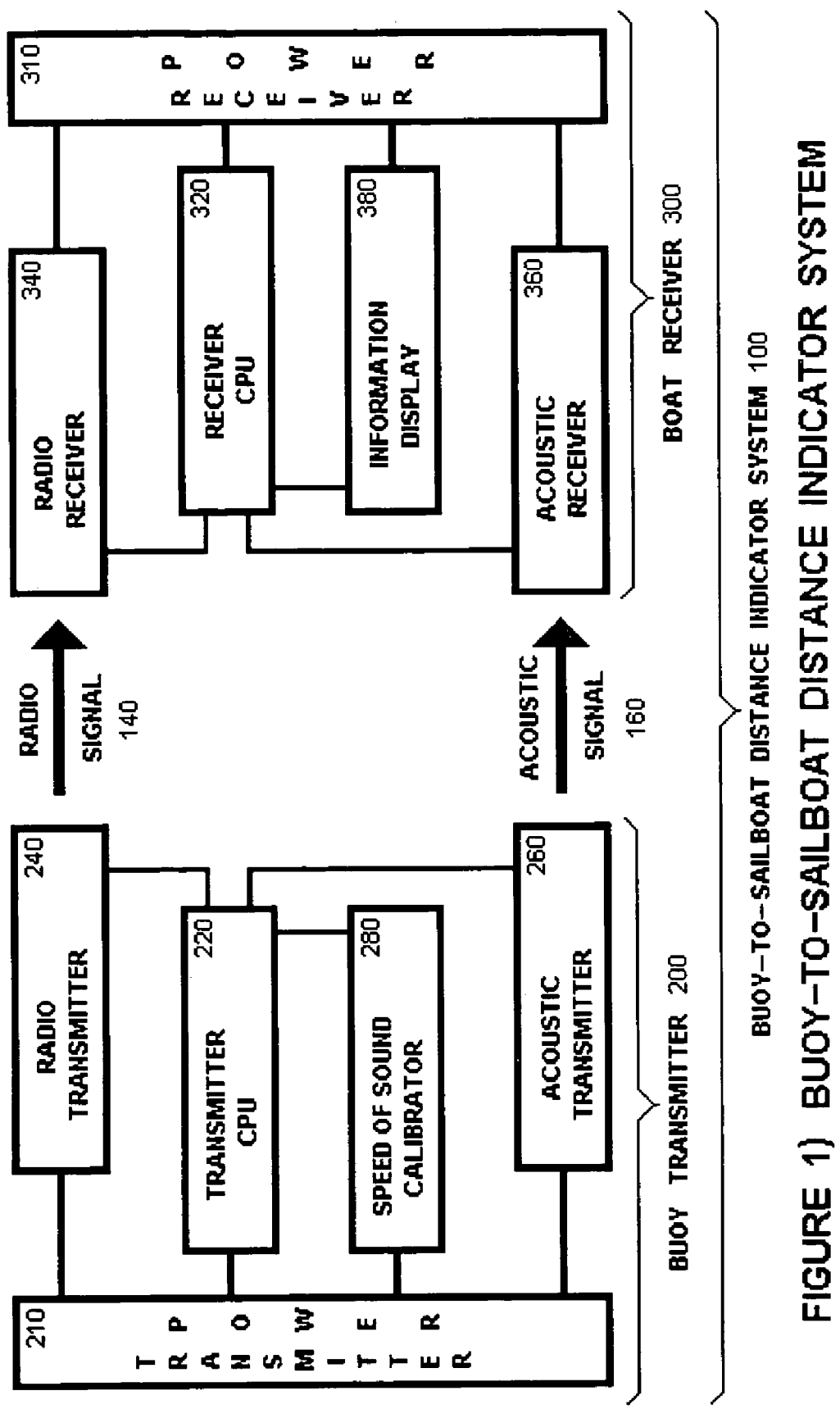
FIGURE 1) BUOY-TO-SAILBOAT DISTANCE INDICATOR SYSTEM

BUOY-TO-SAILBOAT DISTANCE INDICATOR SYSTEM

BACKGROUND OF THE INVENTION

1. Field of the Invention

This invention relates generally to measuring distance, and more particularly to determining the distance during a regatta between a sailboat and a race course marker buoy.

2. Description of the Related Art

It is very important for the crew of a sailboat in a regatta to know how many boat lengths a boat is away from a race course marker buoy. The two boat length distance from the buoy is the point at which the rules change. Thus, as boats in a regatta converge on a buoy, it is important for those boats to know when each boat crosses its two boat length distance from the buoy.

If the boats on the water were cars driving around a specific marker cone placed on the ground, it would be trivial to draw on the ground a circle around the cone, where the circle would have a radius equal to two car lengths. If the cars were of different lengths, the circles could be drawn in different colors, different textures, or any of a number of ways to distinguish the different circles. All cars would then be able to see when one of the cars crosses into that car's circle. Because sailboats move through water, vice cars driving on ground, there is no directly equivalent trivial way to draw a circle around a buoy on the water for all sailors to see, and through or over which boats can pass unobstructed.

What is need is a device which indicates to the crew of its boat and to others when that boat has reached a certain distance away from the buoy.

A number of methods have been developed to measure distances when it is not practical to mark them on the ground or water. Some involve the use of multiple receivers or transmitters, or measurements taken at multiple points, in order to do some form of triangulation. Triangulation methods to determine distance are not of concern here.

Other methods involve the use of time, measuring how long in time it takes a signal to travel the distance being measured, then using that time measurement, along with knowledge of signal's propagation speed through the transmission medium, to convert the time measurement into a distance measurement. The prototypical time method is radar: a source sends out a signal and times how long it takes for the reflection to return. By knowing the rate at which the signal travels, the time of flight can be converted to a distance. Traditional radar uses electromagnetic signals which travel at the speed of light, and divides the time of flight by two since the radar signal transits the distance twice; out and back. Traditional radar is a very good solution for measuring distance when it cannot otherwise be marked on the ground, especially large distances on the order of miles or farther.

For measuring relatively short distances, on the order of feet or inches or less, adaptations have been made to traditional radar. For example, because electromagnetic signals travel at the speed of light, special considerations are needed when using such a fast medium to measure short distances. While distance resolutions on the order of feet, or less, are achievable using electromagnetic based radar, it comes at added costs of size or weight or processing power or complexity or some combination there of.

When the operational environment is not conducive for expansion of size, weight, processing power or complexity, one alternative may be to switch from electromagnetic signals to acoustic signals. This method is typified by sonar and embodied in the acoustic tape measure. The components for generating sound and receiving the reflected sound can be small, light weight, consume little power, inexpensive and are readily available in the commercial market place. Further, because the speed of sound through air is many orders of magnitude slower than the speed of an electromagnetic signal, getting plus or minus one foot resolution, or better, is easily achievable. Handheld battery powered acoustic tape measures are relatively inexpensive commercially available products.

The next evolutionary step in measuring distance is to send an electromagnetic signal in conjunction with an acoustic signal. U.S. Pat. No. 4,136,394, a golf yardage indicator system, is such a system: it transmits an electromagnetic pulse in one direction and a return acoustic pulse in the other direction. In contrast, U.S. Pat. No. 4,055,830, a sonic measuring system, U.S. Pat. No. 4,234,942, an apparatus for measuring the length of pipe and other hollow members, U.S. Pat. No. 5,191,328, a trailer hitching aid, and U.S. Pat. No. 6,404,703, a method and apparatus for distance measurement, each send out both an electromagnetic signal and an acoustic signal in the same direction. In all cases, the speed of the electromagnetic signal is so much greater than the speed of the acoustic signal that the time for the electromagnetic signal can be considered to be zero and the time for the acoustic signal can be converted into a distance measurement.

These systems are each able to utilize a benign operating environment to their own advantage. The golf yardage indicator system does not need to operate for multiple simultaneous measurements because golfers play in a genteel, cooperative manner. The pipe length measuring method is able to operate in the stable environment inside of the pipe. The trailer hitching aid only need operate over distances equal to little more than the length of a trailer. The distance measurement method of U.S. Pat. No. 6,404,703 adds processing and multiple signals to enhance signal detection, along with specifically using the directional nature of ultrasonic signals to provide bearing information.

Each of those U.S. Patents, implicitly or explicitly, also touches on the issue of calibrating for the speed of sound. U.S. Pat. No. 4,055,830 mentions how the speed of sound through air is related to the air temperature. In general, the speed of sound through air can vary from 331 meters per second (m/s) at a temperature of 0 degrees Celsius and 0% relative humidity to 351 m/s at 30 degrees Celsius and 100% relative humidity. This is a 6 percent variation. In contrast, the speed of sound through water can vary from 1402 m/s at 0 degrees Celsius and 0 salinity to 1551 m/s at 30 degrees Celsius and 40 on the practical salinity scale (a 40 on the practical salinity scale would be salty sea water). This is an 11 percent variation. (Pressure does effect the speed of sound in air and water. The just mentioned speeds are for air pressure at sea level and water pressure just below the surface; which are the conditions assumed for this discussion.) Thus the need for accurate and precise calibration in air is almost less than half of what it is in water. To the degree the issue is only relative distance (i.e., getting closer or farther) vice the actual distance measurement, calibrating the speed of sound through its environment may be unnecessary.

While the distance measuring methods discussed heretofore have not directly addressed the issue of measuring the distance between a race course marker buoy and a sailboat during a regatta, that does not mean this problem has not been previously addressed. Some media coverage of the America's Cup regatta (currently one of the most famous, premier sailboat races in the world) in recent years has contained animated graphic presentations which show the boats on the water, in relation to each other as well as in relation to race course marker buoys. These graphics show the two boat length circle around the marker buoys. Such graphic displays are the direct visual equivalent of being able to draw a circle on the water, just like the opening analogy above of drawing circles on the ground for cars going around a cone.

The system used with the America's Cup utilizes position data from sources like the Global Positioning System (GPS). GPS by itself does not report plus or minus one foot, or less, resolution. One solution for improving GPS resolution is to use Differential GPS (DGPS). Another solution is to use an Inertial Navigation Systems (INS). Yet another solution is to do statistical averaging or other mathematical manipulation of the reported data. Whether using GPS, DGPS, INS, statistics, or some other method to determine and report each boat's position to the graphics generator, each buoy also needs to have its position determined and reported to the graphics generator. This can be done for example by having a GPS or DGPS receiver on the buoy, or the crew setting the buoy can have such a receiver and use it when the buoy is set. After the graphic generator has all the information it needs and does its job, the graphic presentation then has to be distributed. For an animated graphic display, the whole process has to be done on a continuing basis. Such a system however requires all boats and buoys to have some capability for of determining their positions, radios for communicating with the graphic equipment, expensive and complicated graphic processor generation equipment, and the communications path for distributing the information generated by the processor.

SUMMARY OF THE INVENTION

In consideration of the problems detailed above and the limitations enumerated in the partial solutions thereto, an object of the present invention is to provide an improved method for measuring and reporting the distance between a buoy and a sailboat.

Another object is to provide an improved method for measuring the distance in such a way that the distance markers do not obstruct the movement of the boat though the water.

Another objective is to provide an improved method for operating in the non-benign, non-cooperative, windy, marine environment in which sailboats race.

Another objective is to provide an improved method for multiple sailboats to simultaneously determine their distance from a common buoy.

In order to attain the objectives described above, according to an aspect of the present invention, there is provided a buoy-to-sailboat distance indicator system whereby the distance is measured by comparing the difference in transmission time for two signals each transmitted via a medium with a different propagation speed than the other. The system calibrates for the speed of sound through water for the present conditions. The buoy sends out a radio signal and a correlated acoustic signal. The difference in time between the received radio and acoustic signals provides the information which is then converted into an indication of the distance from the buoy to the boat. That distance is presented on an information display.

The aforementioned features, objects, and advantages of this method over the prior art will become apparent to those skilled in the art from the following detailed description and accompanying drawing.

BRIEF DESCRIPTION OF THE DRAWING

The invention can best be understood when reading the following specification with reference to the accompanying drawing, which is incorporated in and form a part of the specification, and together with the description, serve to explain the principles of the invention. In the drawing: FIG. 1 is a schematic diagram showing one embodiment of the buoy-to-sailboat distance indicator system.

DETAILED DESCRIPTION OF THE PREFERRED EMBODIMENTS

In one embodiment, as shown in FIG. 1, the buoy-to-sail boat distance indicator system (system) 100 has a buoy transmitter 200 and a boat receiver 300. The buoy transmitter 200 has a transmitter power source 210, a transmitter central processor unit (CPU) 220, a radio transmitter 240, an acoustic transmitter 260, and a speed of sound calibrator 280. The boat receiver 300 has a receiver power source 310, a receiver CPU 320, a radio receiver 340, an acoustic receiver 360, and an information display 380.

The transmitter CPU 220 controls the speed of sound calibrator 280. The speed of sound calibrator 280 provides the transmitter CPU 220 with the speed of sound through water for the operating environment in which system 100 is being used.

The speed of sound calibrator 280, which can be implemented in many ways, measures the speed of sound for the current conditions. One way to implement a speed of sound calibrator would be to measure the temperature, water salinity, and water pressure, and then calculate the speed of sound for those conditions using the appropriate known equations. Another way, somewhat more empirically, would be to measure the time for a signal to transit a known distance. The ways for measuring the speed of sound through water are well known to one of average knowledge in the art.

The transmitter CPU 220 controls both the radio transmitter 240 and acoustic transmitter 260. The transmitter CPU 220 causes the radio transmitter 240 to transmit a radio signal 140 and causes acoustic transmitter 260 to transmit an acoustic signal 160. Radio signal 140 and acoustic signal 160 should be omnidirectional signals. In the simplest embodiment transmitter CPU 220 is programmed with the range distance at which the radio signal 140 and acoustic signal 160 should simultaneously arrive. Using the calibrated speed of sound, the transmitter CPU 220 computes the transmit time delay. The transmit time delay is the amount of time after sending the acoustic signal 160 at which to transmit the radio signal 140 so that both signals simultaneously arrive at a specified range distance. The transmitter CPU 220 causes the acoustic transmitter 260 to send immediately the acoustic signal 160, and then at transmit time delay later causes the radio transmitter 240 to send immediately the radio signal 140.

Just as the transmitter CPU 220 drives both radio transmitter 240 and acoustic transmitter 260, the receiver CPU 320 listens to both the radio receiver 340 and acoustic receiver 360.

In the simplest embodiment, receiver CPU 320 observes which signal, radio signal 140 or acoustic signal 160, arrives first. If acoustic signal 160 arrives first, receiver CPU 320 then knows the range result that boat receiver 300 is closer to buoy transmitter 200 than the specified range distance. If the radio signal 140 arrives first, receiver CPU 320 then knows the range result that boat receiver 300 is farther from buoy transmitter 200 then the specified range distance. The receiver CPU 320 displays range result on the information display 380.

In the simplest embodiment the information display could be just a light which turns on or off when the range result is that boat receiver 300 is closer to buoy transmitter 200 than the specified range distance. Or the light could turn on or off when the range result is that the boat receiver 300 is farther from the buoy transmitter 200 than the specified range distance. Or the information display could be two lights, a first light for when the range result is that boat receiver 300 is closer to buoy transmitter 200 than the specified range distance, and a second light for when the boat receiver 300 is farther from buoy transmitter 200 than the specified range distance. Or, the information display 380 could be a text message saying "less than" or "greater than," as appropriate. Or the information display could use audio signals vice visual signals.

In an alternative embodiment, the transmitter CPU 220 can use the radio transmitter 240 to send the speed of sound information to the receiver CPU 320 via radio signal 140 and radio receiver 340. In this embodiment, receiver CPU 320 measures the received time delay between arrival of the radio signal 140 and the acoustic signal 160. Using the speed of sound and received time delay, the receiver CPU 320 can then compute the measured range distance and sign (i.e., plus or minus) which the boat receiver 300 is from the specified range distance. The measured range distance can be shown on the information display 380 as appropriate.

As a special case of this alternative embodiment, when the specified range distance is set to zero, the measured range distance will be the distance from the buoy transmitter 200 to the boat receiver 300.

In yet another alternative embodiment, boat receiver 300 will have a plurality of acoustic receivers 360. By knowing the relative positions of each acoustic receiver 360, the receiver CPU 320 can use the different arrival times for acoustic signal 160 at each acoustic receiver 360 to determine the relative direction from boat receiver 300 to buoy transmitter 200. The details of how to do such calculations are well known to one of average knowledge in the art.

The unambiguous range is the range under which, in the simplest embodiment, the two correlated signals (radio signal 140 and acoustic signal 160), will have been received at the boat receiver 300 before the next radio signal 140 is received. This range is determined by the time between radio transmissions and the speed of sound for the operating environment. The rate at which the system 100 can measure the distance between transmitter 200 and receiver 300 is also determined by the time between radio transmissions. In an alternative embodiment, the concept of staggered pulse repetition intervals, well known to one of average knowledge in the art in the area of traditional radar, can be applied to this system 100 so as to provide an alternative method for either increasing the unambiguous range, or increasing rate at which the distance measurements are made, or some combination there of.

Transmitter power source 210 powers all other parts of buoy transmitter 200. Receiver power supply 310 powers all other parts of boat receiver 300. Transmitter power 210 and receiver power 310 can be any sort of electrical storage or generation source.

In this system 100 the buoy transmitter 200 is not interrogated in any way by boat receiver 300. One buoy transmitter 200 can service an unlimited number of boat receivers 300.

Depending on the method of implementation, speed of sound calibrator 280 may or may not have parts in common with acoustic transmitter 260.

System 100 components, especially the housings for buoy transmitter 200 and boat receiver 300, should be brightly colored such that they can be easily seen. For example, buoys normally used during sailboat races are brightly colored so that they can be easily seen. Thus, for the same reasons, buoy transmitter 200 should be brightly colored. Having boat receiver 300 brightly colored can facilitate people being able to see that a sailboat has a boat receiver 300. Also, for both buoy transmitter 200 and boat receiver 300, should either fall into the water, having them brightly colored will make them easier to see by people trying to find them.

Because the radio signal 140 travels over the water's surface and the acoustic signal 160 travels below the water's surface, the operations of system 100 can be identified as radio over audio below, and abbreviated to create the word roab.

A buoy-to-sailboat distance indicator system 100 for determining the distance between a buoy and a boat both floating in a common body of water, has a buoy transmitter 200 and at least one boat receiver 300. The buoy transmitter 200, deployed on the floating buoy, has a speed of sound calibrator 280 for producing a measurement of the speed of sound through the body of water, a radio transmitter 240 for producing a radio signal 140 transmitted through the air above the body of water, an acoustic transmitter 260 for producing an acoustic signal 160 transmitted through the body of water, and a transmitter CPU 220. The transmitter CPU 220 receives the measurement of the speed of sound, calculates the trigger times, and triggers the radio transmitter 240 and the acoustic transmitter 260 to transmit respectively the radio signal 140 above, and acoustic signal 160 through, the body of water such that both simultaneously arrive at a predetermined distance across the body of water. A boat receiver 300, deployed on a boat, has a radio receiver 340 for receiving the radio signal 140 transmitted through the air above the body of water, an acoustic receiver 360 for receiving the acoustic 160 signal transmitted through the water, a receiver CPU 320 for determining the relative arrival time between the radio signal 140 and the acoustic signal 160, and determining thereby the distance of the boat from the buoy relative to the predetermined distance. An information display 380 displays the distance information about the distance of the boat receiver 300 from the buoy transmitter 200 relative to the predetermined distance.

In an alternative embodiment a buoy-to-sailboat distance indicator system 100 for determining the distance between a buoy and a boat, both floating in a common body of water, has a buoy transmitter 200 and a boat receiver 300. The buoy transmitter 200 deployed on the buoy has a speed of sound calibrator 280 for producing a measurement of the speed of sound through the body of water, a radio transmitter 240 for producing both a radio signal 140 transmitted through the air above the body of water and for transmitting the measurement of the speed of sound, an acoustic transmitter 260 for producing an acoustic signal 160 transmitted through the body of water, and a transmitter CPU 220. The transmitter CPU 220 receives the measurement of the speed of sound, calculates the trigger times and triggers the radio transmitter 240 and the acoustic transmitter 260 to transmit respectively their radio signal 140 above, and acoustic signal 160 through, the body of water such that both simultaneously arrive at a predetermined distance across the body of water. The boat receiver 300 has a radio receiver 340 for receiving both the radio signal 140 transmitted through the air above the body of water and the transmitted measurement of the speed of sound, an acoustic receiver 360 for receiving the acoustic signal 160 transmitted through the body of water, a receiver CPU 320 for determining the relative arrival time between the radio signal 140 and acoustic signal 160, and determining thereby the distance and sign of distance of the boat receiver 300 from the buoy transmitter 200 and from the predetermined distance. An information display 380 displays the distance and the sign of distance of the boat receiver 300 from the buoy transmitter 200 and from the predetermined distance.

Although various preferred embodiments of the present invention have been described herein in detail to provide for complete and clear disclosure, it will be appreciated by those skilled in the art, that variations may be made thereto without departing from the spirit of the invention or the scope of the appended claims.

The invention claimed is:

1. A buoy-to-sailboat distance indicator system for determining the distance between a buoy and at least one boat both floating in a common body of water, comprising:
   a buoy transmitter deployed on said buoy, further comprising:
      a speed of sound calibrator for producing a measurement of the speed of sound through said body of water;
      a radio transmitter for producing a radio signal transmitted through the air above said body of water;
      an acoustic transmitter for producing an acoustic signal transmitted from said buoy through said body of water; and
      a transmitter CPU for receiving said measurement of the speed of sound, calculating the trigger times and triggering said radio transmitter and said acoustic transmitter to transmit said radio signal above and said acoustic signal through said body of water, respectively, such that both arrive at a predetermined distance across said body of water simultaneously; and
   at least one boat receiver deployed on one of said boats, further comprising:
      a radio receiver for receiving said radio signal transmitted through the said air above said body of water;
      an acoustic receiver for receiving said acoustic signal transmitted through said body of water;
      a receiver CPU for determining the relative arrival time between said radio signal and acoustic signal, and determining thereby the distance of said boat from said buoy relative to said predetermined distance; and
      an information display for displaying said distance of said boat from said buoy relative to said predetermined distance.

2. A buoy-to-sailboat distance indicator system for determining the distance between a buoy and at least one boat both floating in a common body of water, comprising:
   a buoy transmitter deployed on said buoy, further comprising:
      a speed of sound calibrator for producing a measurement of the speed of sound through said body of water;
      a radio transmitter for producing a radio signal transmitted through the air above said body of water and for transmitting said measurement of the speed of sound;
      an acoustic transmitter for producing an acoustic signal transmitted from said buoy through said body of water; and
      a transmitter CPU for receiving said measurement of the speed of sound, calculating the trigger times and triggering said radio transmitter and said acoustic transmitter to transmit said radio signal above and said acoustic signal through said body of water, respectively, such that both arrive at a predetermined distance across said body of water simultaneously; and
   at least one boat receiver deployed on one of said boats, further comprising:
      a radio receiver for receiving said radio signal transmitted through said air above said body of water and for receiving said transmitted measurement of the speed of sound;
      an acoustic receiver for receiving said acoustic signal transmitted through said body of water;
      a receiver CPU for determining the relative arrival time between said radio signal and said acoustic signal, and determining thereby the distance and sign of distance of said boat relative to said buoy relative to said predetermined distance; and
      an information display for displaying said distance and said sign of distance of said boat from said buoy from said predetermined distance.

3. The system of claim 2, wherein said transmitted signal is intermingled with said transmitting said measurement of the speed of sound.

4. The system of claim 2, wherein said transmitted signal is not intermingled with said transmitting said measurement of the speed of sound.

5. The system of claim 1, wherein said information display comprises a first light which indicates when said boat is at a distance greater than said predetermined distance.

6. The system of claim 1, wherein said information display comprises a first light which indicates when said boat is at a distance less than said predetermined distance.

7. The system of claim 1, wherein said information display comprises a first light which indicates when said boat is at distance greater than said predetermined distance and a second light which indicates when said boat is at distance less than said predetermined distance.

8. The system of claim 2, wherein said information display comprises a first light which indicates when said boat is at a first distance greater than said distance and side sign of distance of said boat from said buoy from said predetermined distance.

9. The system of claim 8, wherein said information display comprises a second light which indicates when said boat is at a second distance greater than said distance and said sign of distance of said boat from said buoy from said predetermined distance.

10. The system of claim 2, where in said information display comprises a first light which indicates when said boat is at a first distance less than said distance and said sign of distance of said boat from said buoy from said predetermined distance.

11. The system of claim 8, wherein said information display comprises a second light which indicates when said boat is at a second distance less than said distance and said sign of distance of said boat from said buoy from said predetermined distance.

12. The system of claim 1, wherein said buoy transmitter is brightly colored.

13. The system of claim 2, wherein said buoy transmitter is brightly colored.

14. The system of claim 1, wherein said boat receiver is brightly colored.

15. The system of claim 2, wherein said boat receiver is brightly colored.

16. The system of claim 1, wherein said boat receiver has a plurality of said acoustic receivers.

17. The system of claim 2, wherein said boat receiver has a plurality of said acoustic receivers.

18. The system of claim 1, wherein said system is identified by the word roab.

19. The system of claim 2, wherein said system is identified by the word roab.

* * * * *